Figure 1:
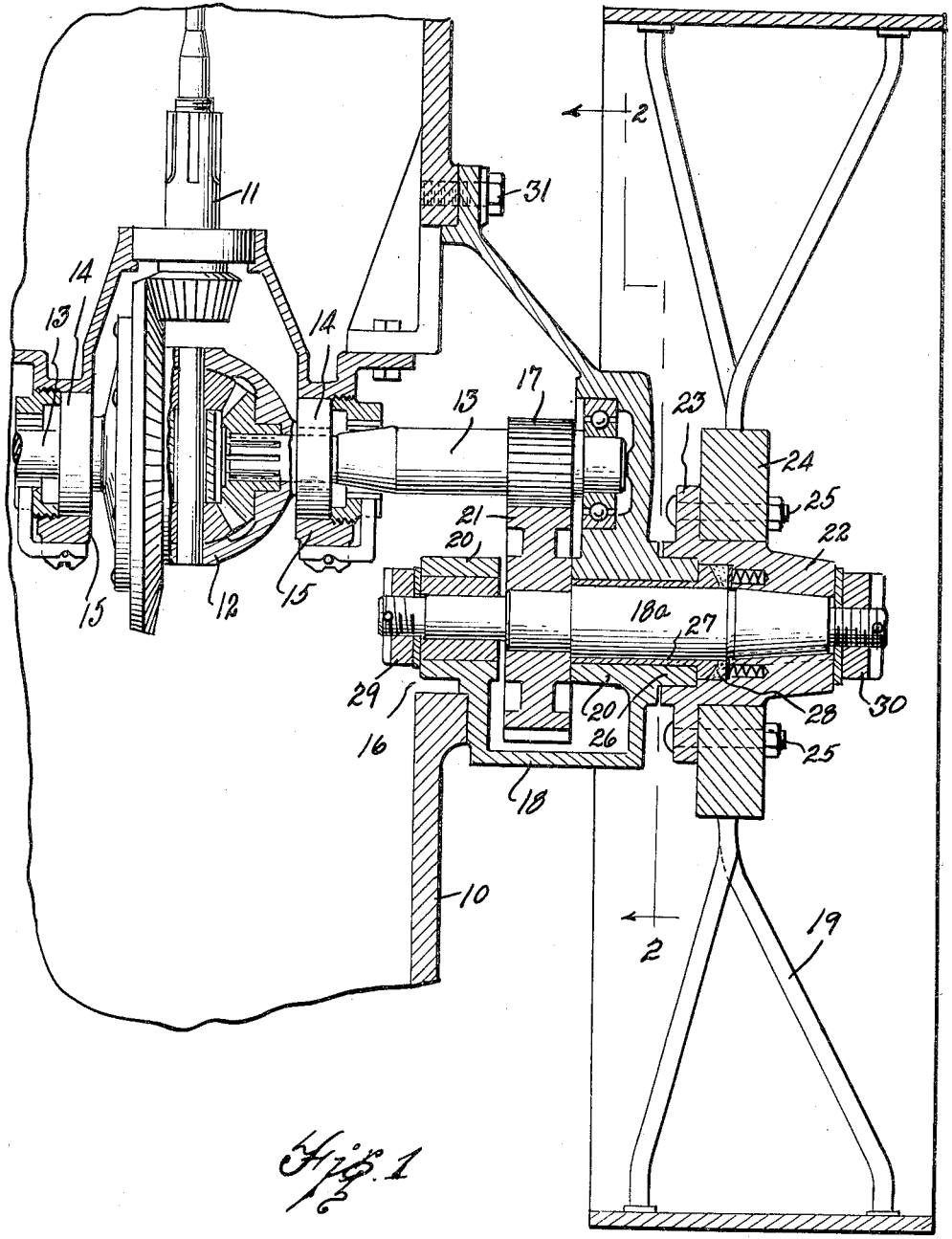

June 16, 1931. R. H. WHITE 1,810,635
SUPPORTING AND DRIVING MEANS FOR TRACTORS
Filed Sept. 27, 1928  2 Sheets-Sheet 1

INVENTOR.
ROLLIN H. WHITE
BY
Wayne M. Hart
ATTORNEY.

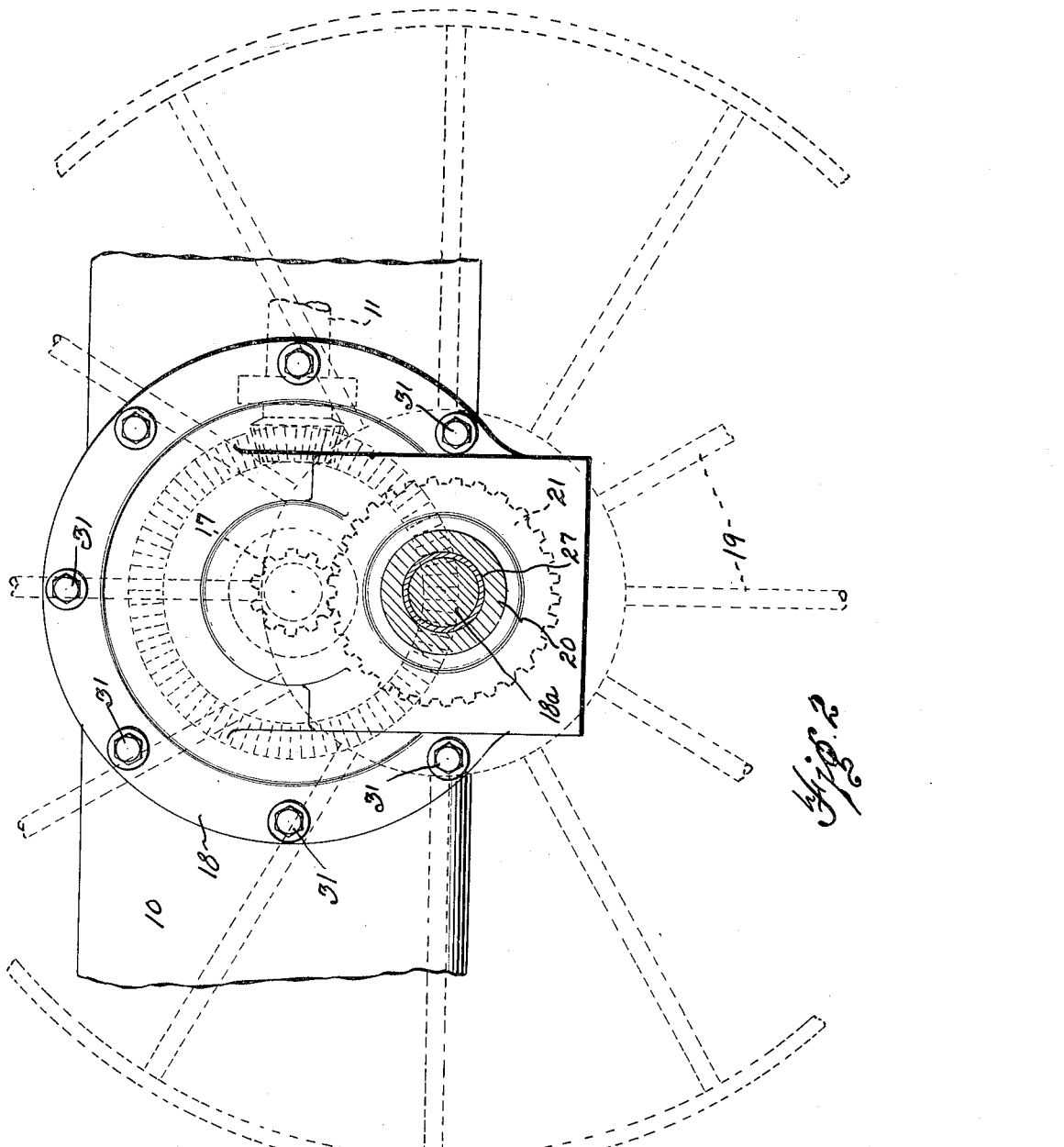

Patented June 16, 1931

1,810,635

UNITED STATES PATENT OFFICE

ROLLIN H. WHITE, OF CLEVELAND HEIGHTS, OHIO

SUPPORTING AND DRIVING MEANS FOR TRACTORS

Application filed September 27, 1928. Serial No. 308,772.

My invention relates to tractors, and more particularly to supporting and driving means for traction wheels.

An object of the invention is to provide a tractor with supporting and driving means for traction wheels which can be adjusted to vary the elevation of the main frame relative to the ground for different classes of work, or to lower the axis of the wheel which runs in the furrow when plowing.

Another object of the invention is to provide a simple, unitary assembly for supporting tractor traction wheels which can be readily fixed in relation to the main frame of a tractor in any one of a plurality of positions relative to the drive shafts.

A further object of my invention is to provide a novel form of driving mechanism for tractor wheels which lends itself to permit adjustment of the position of the axes of the wheels relative to the main frame without disturbing the driving connections.

Another object of my invention is to provide a propelling wheel structure for tractors which can be readily reversed to laterally vary the plane in which the ground engaging rim portion rotates, so that the lateral clearance between the wheels can be regulated.

These and other objects will appear in the following description of an embodiment of my invention illustrated in the accompanying drawings.

In the drawings, Fig. 1 is a fragmentary horizontal section of a tractor embodying my invention; and Fig. 2 is an elevation of the same taken on line 2—2 of Fig. 1, with the axles arranged at about 90° from the disclosure in Fig. 1.

Referring now to the drawings by characters of reference, 10 represents a transmission casing, which preferably forms a section of the main frame, and in which extends the propeller shaft 11 and differential gearing 12 which is arranged to be driven by the propeller shaft. A pair of drive shafts 13 are associated with the differential gearing and extend from opposite sides thereof, such shafts being supported in bearings 14 carried by seats 15 within the casing 10.

The invention lends itself particularly to tractors having but two wheels. However, the invention applies to tractors having more than two wheels. As the wheel structures and driving mechanism are similar, I have illustrated and will describe only one. The sides of the transmission casing are provided with similar circular openings 16, one of which is shown, the centers of which are in alignment with the drive shafts. The drive shaft 13 is arranged to project through the opening in the side of the transmission casing and centrally thereof, the end of the shaft exterior of the casing carrying a gear 17.

A wheel supporting and driving means is associated with the side of the transmission casing and with the gear 17. A wheel support 18, preferably in the form of a single casting, is adapted to cover the opening 16, the outer end of the drive shaft, and also to carry the driven axle 18ª and the traction wheel 19. The support is formed with spaced bearing members 20 for receiving the driven axle, and a gear 21 is fixed to the driven axle, intermediate the bearing member, and meshes with the gear 17. A hub section 22 is keyed to the outer end of the driven axle, which projects through an aperture in the wall of the support casting, such hub section being provided with an annular flanged portion 23 to which the hub section 24 of the wheel is removably secured by bolts 25. The inner portion of the hub section 22 telescopes over an annular flange 26 extending from the supporting member 18, and a bushing 27 is interposed between the driven axle and the outer bearing 20. Suitable dust proofing 28 is provided around the driven axle and between the end of the bushing 27 and hub section 22. Suitable securing means 29 and 30 are provided at opposite ends of the driven axle to prevent endwise displacement thereof, such means being in the form of washers and nuts which are screwed on the threaded axle ends.

It will be seen that the driven axle is mounted eccentrically of the center of the supporting member 18, so that the axle will extend in spaced parallel relation to the associated drive shaft 13. The supporting member can therefore be moved circularly around the drive axle and secured to transmission casing without changing the driving relation of the gears 17 and 21. Studs 31 are provided to secure the peripheral portion of the supporting member to the side of the transmission casing. The openings in the peripheral portion of the member through which the studs are projected are equally spaced so that the supporting member can be secured in as many positions around the drive shaft as there are openings.

It will be seen that a single member is utilized to carry the wheel and the driven axle mechanism and to enclose the opening in the transmission casing and the drive shaft. The supporting member, wheel and driving axle are assembled as a unitary structure, and can be bodily adjusted without disturbing the driving relation between the drive shaft and the driven axle.

As shown in Fig. 2 of the drawings, the wheel axle is arranged in its lowermost position which permits such wheel to run in a furrow without tilting the transmission casing, provided the other wheel is arranged in a higher elevation. The position of the wheels is independently adjustable, and the elevation of the transmission casing above the ground can be raised or lowered by adjusting and securing both wheel supporting structures similarly. Several adjustments are thus possible to vary the elevation of the main portion of the tractor, and this is desirable for plowing, and cultivation of various kinds which require more or less clearance both above and under the main frame.

The wheel including the hub section, spokes and ground engaging rim are readily detachable from the hub section 22. The hub section 24 is arranged in a plane at one side of the center of the rim so that the lateral position of the rim relative to the main frame can be varied by reversal of the wheel when associated with the hub section 22. In this manner the lateral clearance between the rims of the wheels can be varied, and such adjustment is very desirable with the various kinds of cultivation work in which a tractor serves as the motive power. Such adjustment can be readily made by removing the bolts 25 and reversing either one or both of the wheels on the hub section 22.

Various changes can be made in the details illustrated and described without departing from the spirit of my invention and the scope of what I claim.

What I claim is:

1. In a tractor having driven axles projecting from the sides thereof, traction means comprising a hub section fixed to each of said axles, and a wheel having a hub section detachably secured to each of said fixed hub sections, said wheels being reversible relative to said fixed hubs.

2. In a tractor having driven axles projecting from the sides thereof, traction means comprising a hub section fixed to each of said axles, and a reversible wheel associated with each of said fixed hub sections, said wheels including a rim and a hub section located in a lateral plane at one side of the center of said rim, said wheel hubs being detachably secured to said fixed hubs.

In testimony whereof I hereunto affix my signature.

ROLLIN H. WHITE.